Oct. 1, 1929.         W. NOBLE         1,729,841
STEERING WHEEL BRAKE
Original Filed May 7, 1920    6 Sheets-Sheet 3
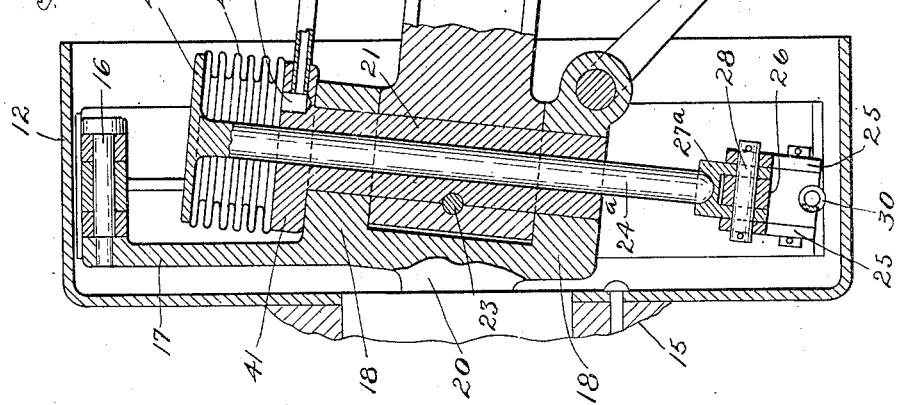
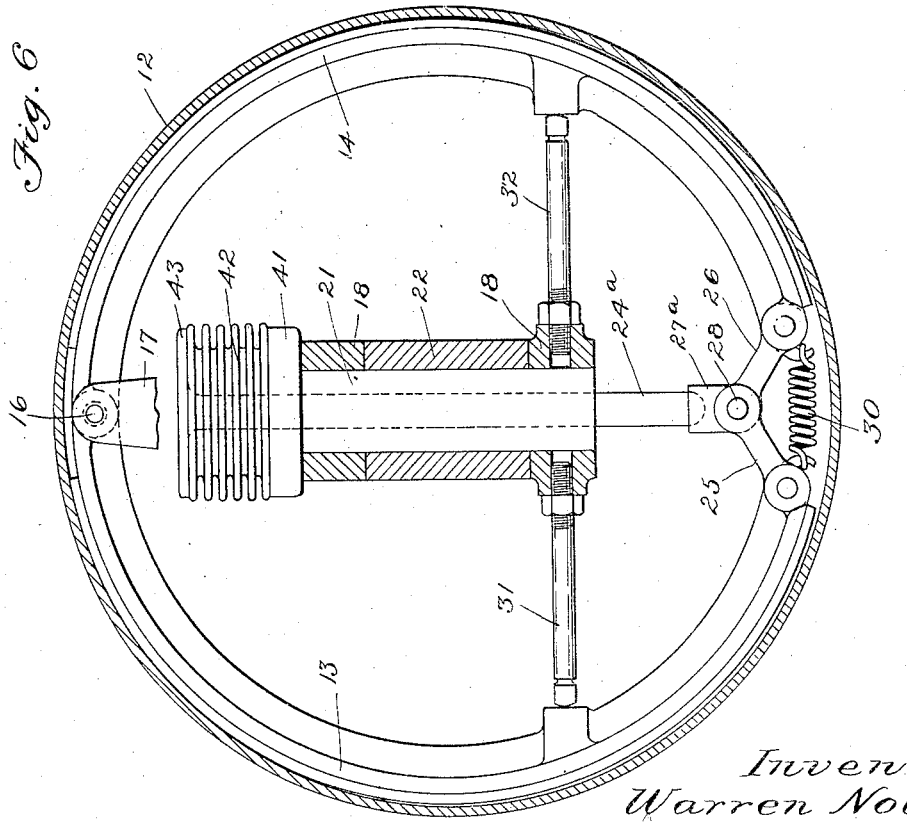
Inventor
Warren Noble
By Wright, Brown, Quinby & May
Attorneys Oct. 1, 1929.   W. NOBLE   1,729,841
STEERING WHEEL BRAKE
Original Filed May 7, 1920   6 Sheets-Sheet 4
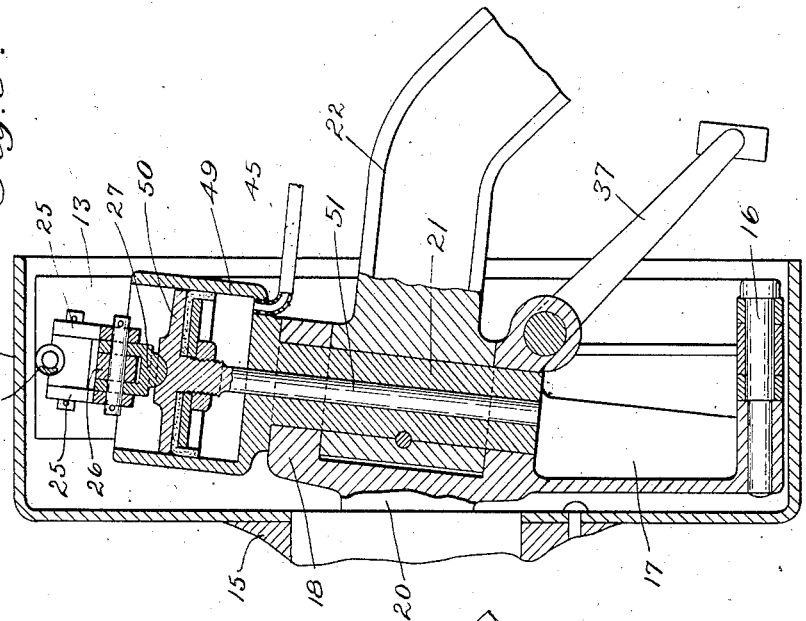
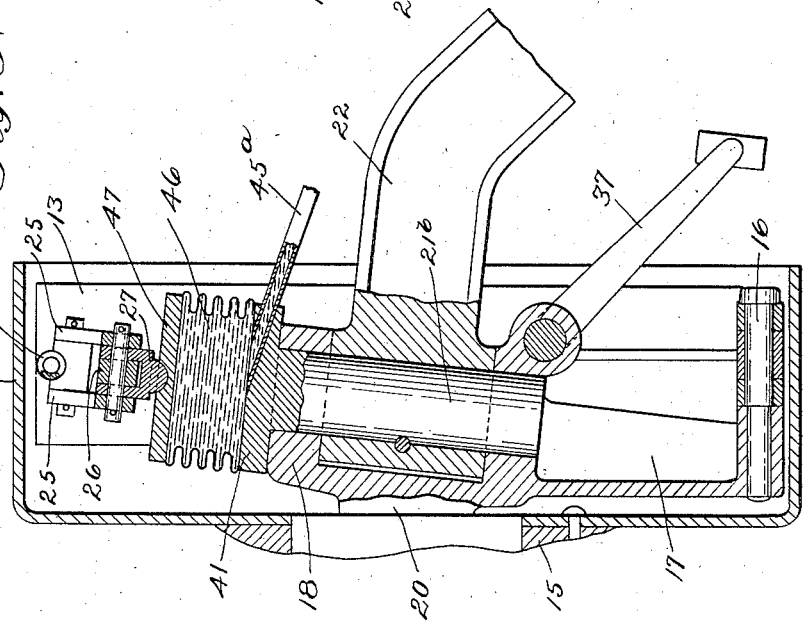
Inventor
Warren Noble
by Wright, Brown, Quinby & Hay
Attorneys

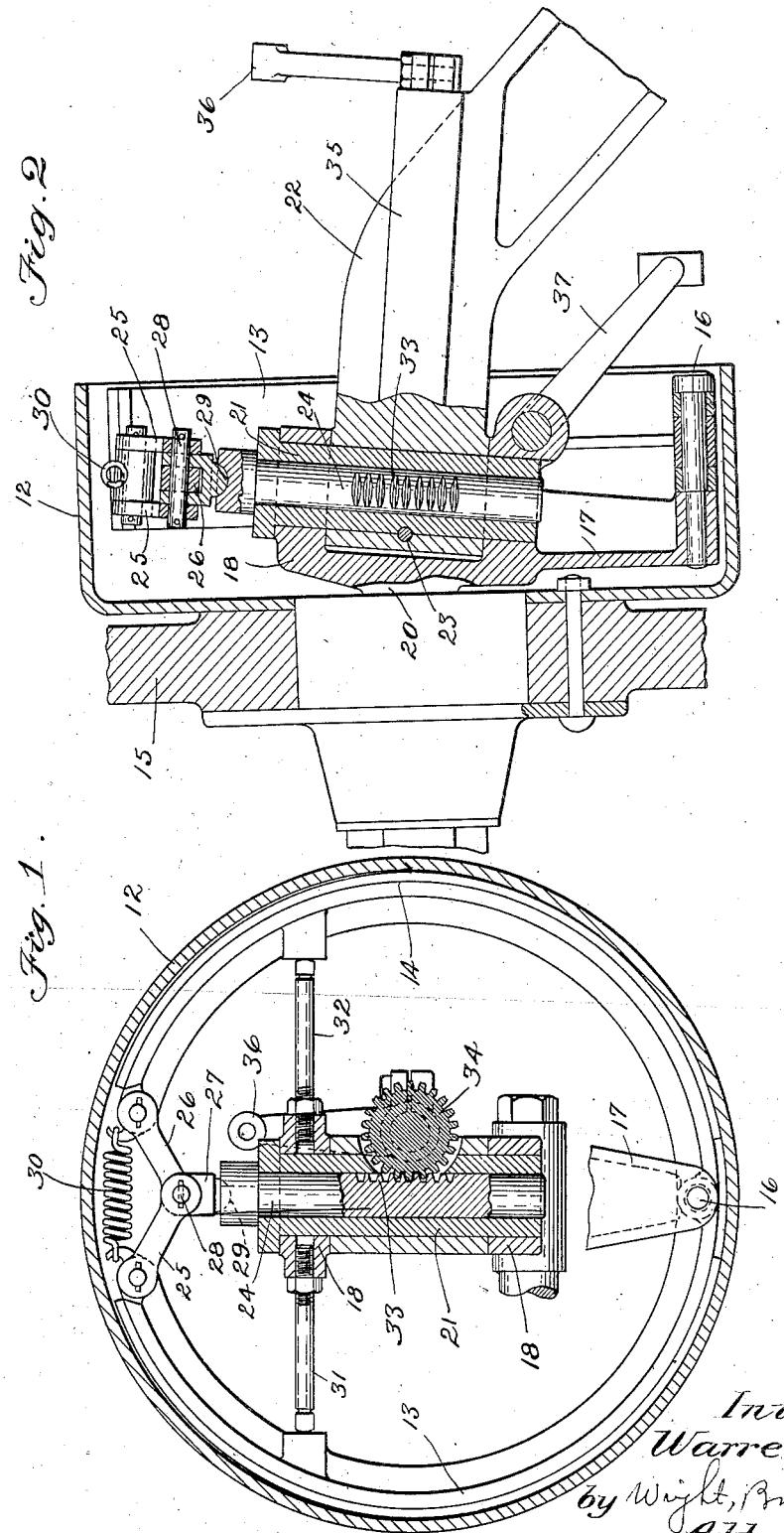

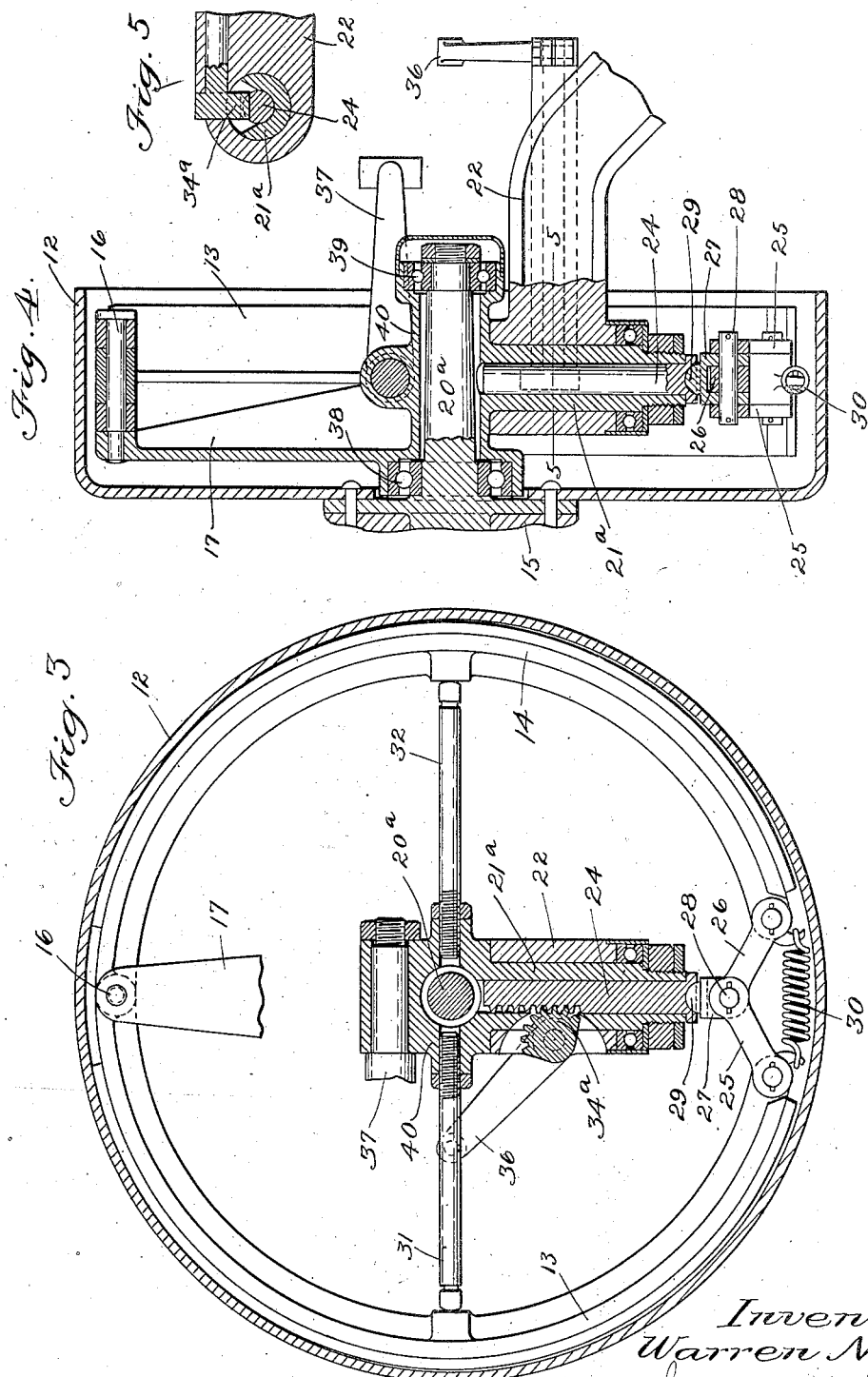

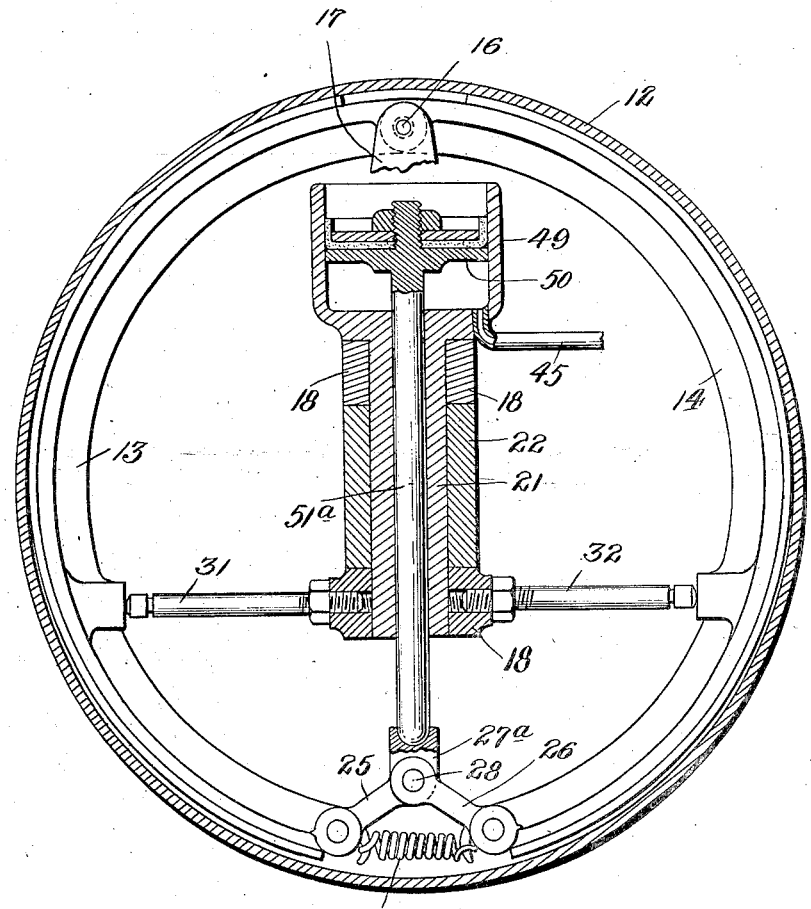
Fig. 9.ª

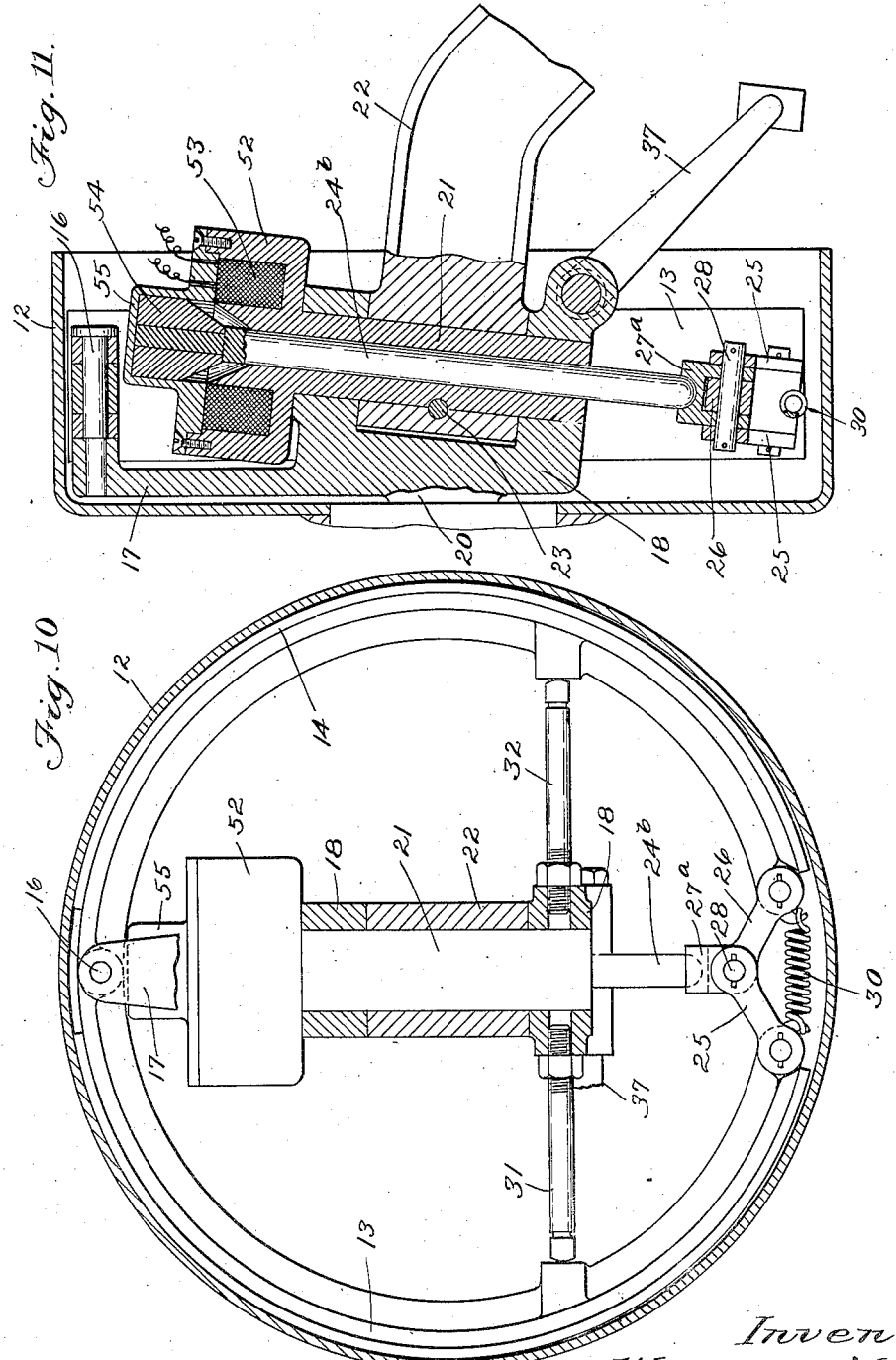

Patented Oct. 1, 1929

1,729,841

UNITED STATES PATENT OFFICE

WARREN NOBLE, OF PROVIDENCE, RHODE ISLAND, ASSIGNOR TO WILLIAM H. THORNLEY AND WARREN NOBLE, OF PROVIDENCE, RHODE ISLAND, TRUSTEES

STEERING-WHEEL BRAKE

Application filed May 7, 1920, Serial No. 379,437. Renewed February 18, 1928.

The purpose of the present invention is to enable brakes to be combined with the pivoted steering road wheels of motor vehicles and trailers. Under the classification of "motor vehicles" in this connection I include all types and descriptions of carriers used for transporting either persons or goods, driven by any motive power whatever and upon which the application of brakes may be desirable to check the speed. Most motor vehicles are steered by turning the front wheels laterally, although in some types and makes the rear wheels are turned for this purpose; while some designs of cars or trucks which are attached as trailers to motor vehicles are steered by turning both the front and rear wheels simultaneously toward opposite sides. The wheels thus moved or turned for steering are considered for the purposes of this specification as the steering road wheels of the vehicle, whether they are the front wheels or the rear wheels, and whether found in an automotive vehicle, or one which is adapted to be propelled by external force. In all of the types of vehicle now under consideration, the steering road wheels are mounted upon separate and individual pivots which, for the purpose of this description, will be considered as vertical, although usually such pivots are somewhat inclined for special reasons which have no connection with the present invention. In the following specification I will for brevity refer to the pivot or axis about which a steering road wheel of the vehicle is turned for the purpose of steering, as the "steering pivot"; and that term, wherever it is found without qualifying terms, is to be understood as having the meaning thus assigned to it.

For many reasons it is desirable that the pivoted steering wheels of such vehicles as are here considered should be equipped with brakes. The brakes for such wheels should be so arranged that when applied or set to exert retarding effort they will not cause a drag resistant to the steering movement of the wheels, and further that they may be applied equally in whatever may be the momentary position of the steering wheels or the rate of change of such wheels from one position to another. The constructions heretofore devised of brakes for pivoted wheels have frequently employed universally jointed systems of links and levers. Such constructions have been unsatisfactory and even dangerous through failure to contain the essential characteristics last above stated, since many errors result both from the jointing of such system to the frame of the vehicle and from the lateral movement of the pivoted wheels.

Having regard to the conditions hereinbefore set forth it has been my purpose to devise a brake mounting for pivoted vehicle wheels and a means for applying the brakes thereof which shall fulfill the conditions of avoiding drag on the steering gear and of capability for being applied or set in entire independence of the position or rate of change of position of the steering wheels. This object has been accomplished in the present invention by locating the brake extensor (that is, the element which applies the brake) in the steering pivot axis and arranging it to move, exert force upon the brake, and to receive its actuating force, all in the line of such axis; and further by transmitting the actuating force for the brake extensor through means which avoid universal joints of any and all orders, and are not affected by shifting of the wheel. The essential principles of the invention, having the characteristics last above noted may be embodied in various forms, by which the actuating pressure may be applied, respectively, either by mechanical means, or by fluid pressure, or by electrical means. The drawings here furnished for illustration show forms of the invention utilizing each of these types of means. In the drawings, Figures 1 and 2 are sectional views taken in a plane parallel to the wheel rim and in an axial plane, illustrating one form of the invention embodying mechanical actuating means.

Figures 3 and 4 are similar views illustrating another form of mechanical means, and Figure 5 is a sectional detail view taken on a horizontal plane designated by the line 5—5 of Figure 4.

Figures 6 and 7 are sectional views respectively in a plane parallel to the wheel rim and in an axial plane, illustrating fluid pressure means for actuating the brake extensor.

Figures 8 and 9 are axial sections illustrating two other forms of fluid pressure actuating means for the same purpose.

Figure 9ª is a view similar to Figure 6 showing a piston arranged to obtain the same result under predominant external pressure.

Figures 10 and 11 are sectional views of the nature previously explained illustrating an electrical means for applying actuating force to the brake extensor.

Like reference characters designate the same or corresponding parts in all the figures.

In these drawings I have shown as the brake elements proper a standard and conventional form of brake drum and cooperating brake shoes used with automobiles. In each of the figures, except 5, a brake drum is indicated at 12, and the complemental brake shoes at 13 and 14. The brake drum is secured to the wheel 15 coaxially thereof, as indicated in the axial sections. The brake shoes occupy the interior of the drum, together subtending nearly the entire circumference thereof. They are pivoted by a pin 16 to a bracket arm 17 which extends downwardly, in the forms shown in Figures 1, 2, 8, and 9, and upwardly in the forms shown in Figures 3, 4, 6, 10, and 11, from the knuckle 18 which carries the stub axle 20 whereon the wheel is mounted. The scope in which I claim protection for the invention is not intended to be limited to the details of the brake, for any form of brake drum and cooperating shoe or band, capable of being combined with an extensor and means for actuating said extensor, in accordance with the principles hereinafter explained, is within the scope of such of my appended claim as are not otherwise clearly restricted.

21 is the pivot by which the stub axle knuckle is connected to the stationary rigid axle 22 of the vehicle. The part designated as the axle 22 typifies any part of the vehicle, such as a bar, bracket, and so forth, to which the steering wheel may be connected by a pivot. Pivot 21 is substantially or nearly vertical, enabling the steering wheel to be turned horizontally to one side or the other, but may have such divergence from an exactly vertical position as required by standard motor car construction. For the purposes of this specification it will be called the "steering pivot"; and the stub axle 20 will be called the "steering axle". In distinction from the steering pivot, the pin 16 previously described may be called the "brake shoe anchor pin". The steering pivot is secured in the axle or bracket 22 by a transverse key pin 23.

Referring more particularly now to the mechanically actuated brake shown in Figures 1 and 2, the brake extensor is there represented by a plunger 24 which is located axially in the steering pivot, the latter being made as a sleeve to accommodate it. The extensor is adapted to exert applying effort to the brake shoes, doing so through a toggle movement comprised by links 25, 26 hinged respectively to the two brake shoes, and a block 27 engaged with the knuckle pin 28 of the toggle, and having a tapered (here shown as hemispherical) end 29 entering a socket in the end of the extensor plunger. 30 represents a take-off spring stretched between the free ends of both brake shoes, and acting when the applying force is relaxed to withdraw the brake shoes from contact with the drum until they bring up against stop rods 31, 32 projecting opposite ways from the steering knuckle and mounted in an adjustable manner thereon.

The tapered or hemispherical projection 29 and the socket in which it enters are located in the axis of the steering pivot and form a swivel joint in the brake-applying means which permits the applying effort to be exerted with equal effect regardless of the position or movement of the steering wheel.

In the side of the extensor plunger are cut a series of rack teeth 33 and meshing with such teeth is a pinion 34 on a shaft which occupies a bearing 35 secured in any convenient and suitable manner to the axle 22, and carries an arm 36. This arm may be connected with a rod, link, or lever forming part of a brake-applying system of any desired sort. Obviously the brake-applying system will be so arranged that when moved in the manner corresponding to an intention on the part of the driver to apply the brake, the pinion 34 will be rotated to raise the extensor plunger and so force the brake shoes against the drum.

As the bearing for the pinion 34 and its shaft is mounted on a fixed and relatively stationary part of the vehicle, the system of rods, levers, or other means for working the brakes may be of the same sort as used with the driving wheels of motor cars, and need have no universal joints, neither is it disarranged in the slightest by the steering movement of the wheel. The entire relative movement between the brake and its applying mechanism, as the result of the steering movement of the wheel, is solely an angular movement, without any linear displacement whatever.

37 represents a common form of arm connected to the steering knuckle for turning the wheel, and typifies any form of means which may be applied for this purpose.

In Figures 3, 4, and 5 there is represented a modification of the mechanical brake mechanism just described adapted to a form of wheel mounting wherein the stub axle is fastened to the wheel and the steering pivot carries the bearings for such stub axle and turns in the fixed axle of the car. Here 20ª represents the stub axle secured to the wheel, 38 and 39 are the bearings therefor and 40 is a sleeve or hub holding said bearings and made a part of the steering pivot 21ª. Since the steering pivot turns in the fixed axle, the recess in its side through which the plunger actuating gear segment 34ª (equivalent to the pinion 34) passes is widened angularly. Except for the differences above noted, and the facts that the steering arm 37 is connected to the sleeve 40 and that the entire brake mechanism is reversed as to its vertical arrangement, the present modification is identical with that previously described.

Figures 6 and 7 show a form of pressure-actuated brake extensor in which the atmospheric pressure is availed of to furnish the applying force through the agency of a collapsible chamber in which a more or less complete vacuum is produced. Here the end of the steering pivot opposite to the brake extending toggle is enlarged to form a head 41 to which is connected one end of a hermetically closed corrugated tube 42, similarly connected at its opposite end to a head 43 connected with the extensor plunger 24ª. The heads 41 and 43 with the corrugated tube 42 form a collapsible and extensible chamber of the type commonly known as a sylphon bellows. The interior of this chamber is connected by a port 44 and a pipe 45 with any suitable suction means whereby the gaseous contents of the collapsible chamber may be exhausted. When applied to a motor car having an internal combustion engine, the eduction pipe 45 may be coupled with the intake manifold of the engine; while with other, or any, types of vehicle a special pump may be provided for that purpose. The sylphon bellows construction here shown typifies any collapsible chamber having opposed walls, one of which is movable toward the other by external atmospheric pressure greater than the force tending to hold such walls apart. A cylinder and piston may be substituted for the bellows chamber, in essentially the same way that the cylinder and piston shown in Figure 9 is a substitution for the bellows chamber, Figure 8, later described. In other respects the construction and mode of operation of the brake are the same as in the two forms previously described.

Figure 8 shows an extensible and collapsible bellows chamber motor 46 adapted to be actuated by excess of internal fluid pressure over the external atmospheric pressure. It is constructed of corrugated tubing connected at one end to a head 41 on the steering pivot and at the other end to a head 47 which takes the place of the extensor plunger shown in the previously described forms, and acts directly against the center block 27 of the toggle linkage. A pipe 45ª conducts the actuating fluid through this chamber. Such fluid may be oil taken from the forced feed lubricating system and delivered into the extensor chamber 46 by the pump provided to force lubricant into the engine bearings, or it may be compressed air, or any other liquid or gas put under pressure by any means, whether automatic or impelled by the muscular power of the driver. Otherwise, and except for the fact that the steering pivot is solid instead of tubular, this embodiment of the invention is substantially identical with those previously described.

Figure 9 shows a cylinder 49 and piston 50 as means equivalent to the sylphon chamber shown in Figure 8; the piston being arranged to bear against the toggle center block 27. There is also shown a guide stem 51 passing from the piston through the axial bore of the steering pivot, such stem being provided, on account of the short length of the piston, to prevent cramping of the latter within the cylinder. This cylinder is represented as an integral part of the steering pivot, but it may be otherwise connected thereto. Substantially this cylinder and piston, with which the piston, reversed so as to work under predominant external pressure, may be substituted for the collapsible chamber shown in Figures 6 and 7, the guide stem 51ª in that case being extended to function as the plunger 24ª of Figures 6 and 7. Such modification and substitution is illustrated in Figure 9ª.

Finally there is shown in Figures 10 and 11 an electromagnetic means for doing the same work. There is secured, integrally or otherwise, to the steering pivot an iron housing 52 in which there is contained a solenoid or electromagnetic coil 53. The extensor plunger 24ᵇ is in this case made of non-magnetic material, and carries on its end a soft iron core 54 which, when the brake is relaxed, is so far out of the magnet coil as to be subject to displacement by the lines of magnetic force when the magnet is energized. A cover 55 is preferably mounted on the coil housing to enclose and protect the core. In other respects the modification last described is essentially identical with those previously described.

It will be appreciated from the foregoing explanation that every embodiment of my invention includes the essential characteristic of a means or extensor for applying a brake against a braking surface connected with the wheel, which extensor is located in or on the steering pivot of the wheel coaxially with such pivot, is movable in the line of such pivot, and exerts force upon the brake in that line; that the actuating force for the extensor, whether such force is mechanical, fluid pressure, or electrical, acts upon the extensor in the same line; and that the intermediate parts which transmit the force of the extensor to the brake are engaged with the extensor in the same axial line and with a pivotal engagement. This pivotal engagement localizes the relative movement which occurs between the wheel, when it is turned, and the force-transmitting means, in this axis exclusively, whereby there is no linear displacement of such means occasioned by the turning of the wheel; while as the force transmitted through said pivotal engagement is substantially in the axis itself, no appreciable torsional stress tends to twist or otherwise displace the force-transmitting means. Hence the brake applying effort is equal, and the extent of motion of the control means operated by the driver is the same, whatever may be the lateral position of the steering wheel at the time of applying the brake, and regardless of whether such wheel is being shifted at the time or not; no drag resistant to the steering movement of the wheel is exerted by the brake-applying means, and the entire system by which force is transmitted from the driver's actuating or controlling means is of simple character and not liable to get out of order. In the particular case using mechanical transmitting means, universal joints are unnecessary and the only joints needed may be simple pivots; and in the fluid pressure transmission means the piping may be made without slip joints or stuffing boxes and therefore hermetically sealed.

Another feature common to all forms of the invention here illustrated is that the bracket 17, which supports the pin or pins on which the brake shoes are pivoted, is located next to the wheel, and outside of the brake shoes. This bracket is the means or structure which resists the application of torque on the brake shoes by the brake drum. It is the torque resisting structure of the brake assemblage. This term, "torque resisting structure" may be considered as a generic term including all structures having the same purpose and function as the bracket 17, whether specifically like or unlike the various forms and arrangements of bracket shown in these drawings. Otherwise stating the relation which exists between this structure, the brake shoes and the wheel, it may be said that the torque-resisting structure is substantially in a plane between the brake shoes and the wheel. The advantage which follows from this arrangement is that the brake shoes may be stripped from within the brake drum without need of removing the wheel. All that is necessary to be done is to remove the pivot 16, or release any other equivalent means which may be provided to support the brake shoes, and then withdraw the shoes from the open side of the brake drum. The swivel engagement between the toggle linkage and the extensor plunger enables them to be disengaged from the latter without difficulty. The brake shoes, being then disengaged from one another at the ends which were mounted on the pivot pin, offer no obstacle to removal from the axle.

The particular form of brake here shown, consisting of two brake shoes symmetrically arranged and combined with toggle links for transmission of the applying pressure, is a useful and desirable feature on account of the fact that it enables substantially uniform pressure to be applied throughout almost the entire surface of the brake drum by simple means.

While I claim this feature as part of my invention, I do not exclude from the scope of my protection other forms of brake which are or may be capable of combination with an extensor arranged and acting in the line of the steering pivot axis having a pivotal engagement in such line with the brake. One detail here shown which may obviously be changed without departure from the invention, is that of pivoting both brake shoes on the same anchor pin. Separate anchor pins may be furnished for the individual brake shoes if desired.

One form of the invention, containing the basic principle herein explained, is shown and claimed in my prior application for patent entitled Fluid pressure brake system for automobiles, filed February 16, 1920, Serial Number 358,822. The present is a continuation as to all common subject matter of the said prior application.

What I claim and desire to secure by Letters Patent is:

The combination with a laterally oscillatable steering road wheel in a vehicle, of a brake-receiving surface associated with said wheel, a brake cooperating with said surface, and applying means for the brake comprising a plunger located in the axis of the steering pivot, and a rotatable gear element in mesh with a longitudinal series of teeth on the plunger and arranged to move the plunger in the line of said pivot and to exert force through the plunger upon the brake.

In testimony whereof I have affixed my signature.

WARREN NOBLE.